E. V. AND F. T. COLLINS.
CLUTCH AND FUEL SUPPLY CONTROL MECHANISM.
APPLICATION FILED JULY 8, 1919.
1,339,435. Patented May 11, 1920.
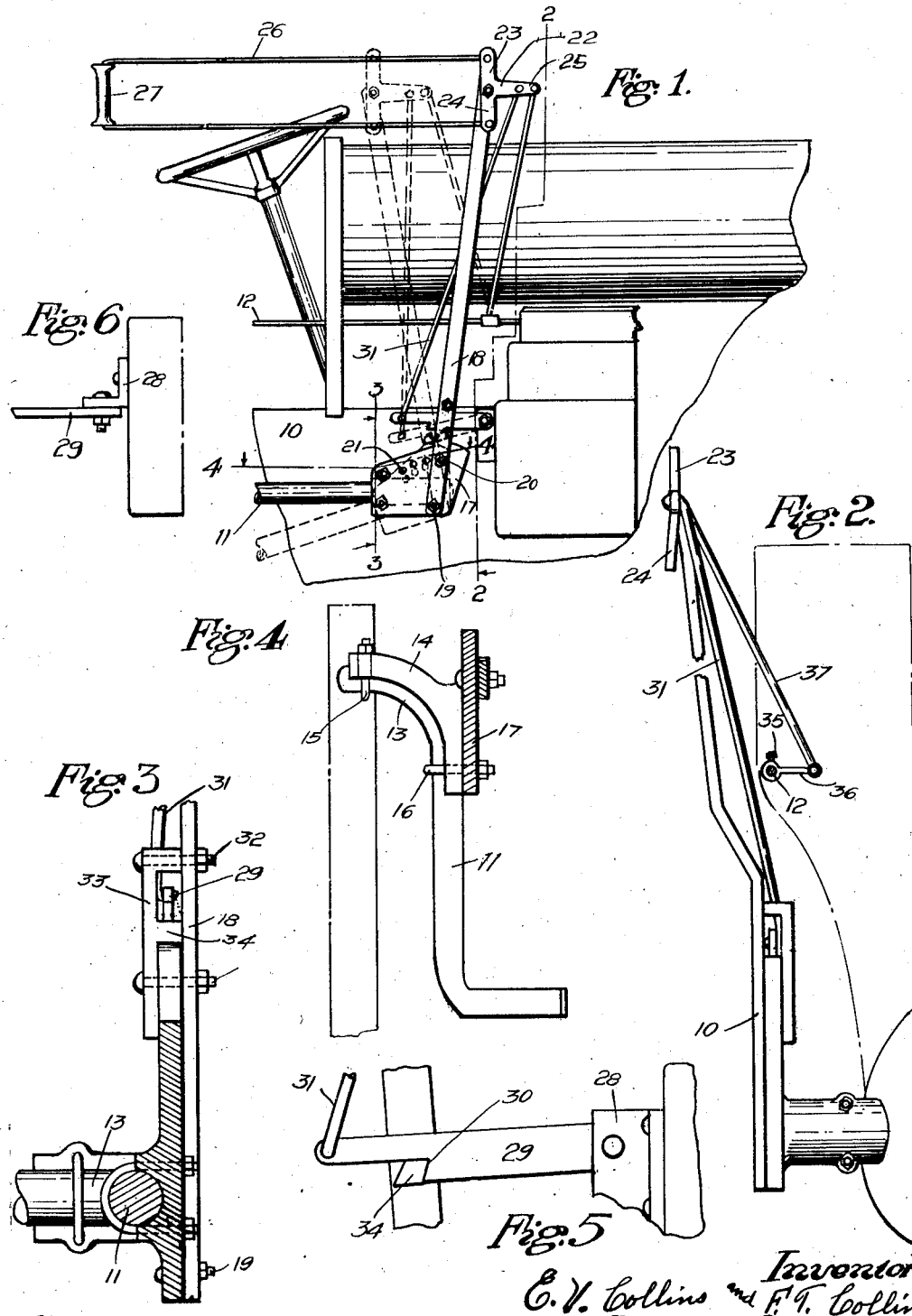
Witness
A. E. Jarvis
Inventors
E. V. Collins and F. T. Collins
By Orwig & Bair Attys

UNITED STATES PATENT OFFICE.

EDGAR V. COLLINS AND FRED T. COLLINS, OF AMES, IOWA.

CLUTCH AND FUEL-SUPPLY CONTROL MECHANISM.

1,339,435.  Specification of Letters Patent.  Patented May 11, 1920.

Application filed July 8, 1919. Serial No. 309,397.

*To all whom it may concern:*

Be it known that we, EDGAR V. COLLINS and FRED T. COLLINS, citizens of the United States, and residents of Ames, in the county of Story and State of Iowa, have invented a certain new and useful Clutch and Fuel-Supply Control Mechanism, of which the following is a specification.

The object of our invention is to provide a clutch and fuel supply control mechanism of simple, durable and inexpensive construction adapted to be used as an attachment on a tractor or the like for controlling the clutch and fuel supply from a position considerably back of the tractor, as for instance, on a binder or other piece of machinery.

More particularly it is our object to provide a means for moving the clutch control lever to its inoperative position, and for locking it in such position from a distance away from the tractor, and for permitting control of the fuel supply with a minimum of mechanism.

With these and other objects in view our invention consists in the construction, arrangement and combination of the various parts of the device, whereby the objects contemplated are attained, as hereinafter more fully set forth, pointed out in our claims and illustrated in the accompanying drawings, in which:

Figure 1 shows a side elevation of a portion of a tractor equipped with a clutch and fuel supply control mechanism embodying our invention.

Fig. 2 shows a detail, sectional view of the mechanism taken on the line 2—2 of Fig. 1.

Fig. 3 shows a detail, sectional view of the controlling mechanism taken on the line 3—3 of Fig. 1.

Fig. 4 shows a detail, sectional view taken on the line 4—4 of Fig. 1.

Fig. 5 shows a detail view of the lock device; and

Fig. 6 shows a detail view of the bracket and the locking member pivoted thereto.

In the accompanying drawings we have used the reference numeral 10 to indicate generally the frame of a tractor having the clutch control lever 11, and the fuel control rod 12.

The clutch control rod has at its forward end an elbow 13, clearly shown in Fig. 4.

Our improved attachment comprises a bracket 14 designed to fit the elbow of the clutch control rod 11, and to be secured thereto by means of U-bolts 15 and 16 as illustrated in Fig. 4.

On the bracket 14 is a plate 17. Fixed to the plate 17 is an upwardly extending lever 18. The lever 18 is fixed to the lower part of the plate 17 by means of a bolt 19, and to the upper part thereof by means of a bolt 20.

The bolt 20 is selectively received in one of a series of holes 21, and by mounting the bolt 20 in different holes 21 the normal position of the lever 18 with relation to the plate 17 and to the clutch control rod 11 may be varied considerably.

Centrally pivoted on the upper end of the lever 18 is a T 22 having arms 23 and 24 extending upwardly and downwardly from its pivot point and an arm 25 extending forwardly from its pivot point.

Secured to the ends of the arms 23 and 24 are the ends of a rope or flexible device 26 which extends rearwardly in the machine and is designed to extend to suitable position to be manipulated from the seat of a binder or mower or the like.

On the rope 26 at its rear portion is a slidable handle or spool or sleeve 27.

It will be seen that by pulling rearwardly on the handle 27 the lever 18 may be pulled rearwardly for swinging the clutch control rod 11 downwardly for thereby throwing the clutch out of gear.

Suitably supported is an angle bracket 28 to which is pivoted a rearwardly extending arm 29 having a shoulder 30. The arm 29 extends rearwardly along side and past the lever 18.

Pivoted to the rear end of the arm 29 is a link 31 which extends upwardly in the machine and is pivoted to the arm 22. Secured to the lever 18 and to the upper portion of the plate by means of a bolt 32 and the bolt 20, already referred to, is an F-shaped guide device 33.

The arm 29 slides between the lever 18, as illustrated in Figs. 1, 2 and 3, and rests upon the lug 34 of the member 33.

It will be seen that when the lever 18 is pulled rearwardly until the shoulder 30 clears the lug 34, then the arm will tend to drop to position shown in Fig. 5 where the shoulder 30 is just forwardly of and engaged by the lug 34, whereupon the clutch control rod 11 will be held in position shown by dotted lines in Fig. 1, which is its position for holding the clutch out of gear.

It will also be seen that by tilting the handle 27, while holding the rope 26 taut, the arm 22 may be swung upwardly for releasing the catch formed by the arm 29, with its shoulder 30 from operative engagement with the lug 34.

The same thing, of course, can be accomplished by pulling rearwardly on the upper stretch of the rope 26.

It will also be noted that by properly tilting the handle 27, or by pulling rearwardly on the lower stretch of the rope 26, positive downward movement may be imparted to the arm 29.

Fixed to the fuel supply control rod 12, by means of a set-screw 35, is a laterally extending arm 36. Pivoted to the outer end of the arm 36 is a link 37 which extends upwardly and is pivoted to the arm 25.

It will be noted that when the lever 18 is in its forward position of movement, the arm 22 may be tilted substantially for actuating the link 37, and the arm 36, for controlling and regulating the fuel supply, without in any way affecting the action of the clutch control lever 18.

It will be noted that we have provided a simple and inexpensive device, which can be mounted by way of an attachment on a tractor.

By the operation of one handle the clutch may be controlled for throwing it into and out of gear, and for locking it in inoperative position or unlocking it and releasing it.

The manipulation of the same handle operates the clutch lever, and operates the locking device, and also operates the fuel supply.

Some changes may be made in the construction and arrangement of the various parts of our improved device without departing from the essential spirit and purposes of our invention, and it is our intention to cover by our claims any modified forms of structure or use of mechanical equivalents which may be reasonably included within their scope.

We claim as our invention.

1. In a device of the class described; the combination of a clutch controlling lever, and a supply control member; with a controlling mechanism including a handle operatively connected with said clutch controlling lever and said fuel control member; the parts being so constructed that by the manipulation of said handle the clutch may be controlled and the fuel supply control member may be controlled; and a locking device for the clutch lever controllable from said handle.

2. In a device of the class described; the combination of a clutch controlling lever, with a controlling mechanism therefor including a handle; a lock for said clutch lever, the parts being so arranged that by the manipulation of said handle the clutch controlling lever may be controlled and said lock device may be moved to operative or inoperative position.

3. The combination with a handle of a clutch control lever and a fuel control member and a locking device for said clutch control lever; and means for operatively connecting said handle with said clutch control lever and said fuel control member, and said lock device, whereby with one movement of the handle the clutch control lever may be operated, and with another movement of the handle the lock device may be released and the fuel control member actuated.

4. In a device of the class described; the combination of a clutch control lever; a fuel control member, with a lever connecting said clutch control lever; a locking device for locking the clutch control lever in a certain position of its movement, a T-shaped member pivotally mounted on said second lever at its central portion; controlling members secured to the opposite arms of said T-shaped member, a handle operatively connected with said last described controlled controlling member; and means for operatively connecting the other arm of said T-shaped member with said fuel control member and said lock device.

Des Moines, Iowa, May 26, 1919.

EDGAR V. COLLINS.
FRED T. COLLINS.